United States Patent
Faa et al.

(10) Patent No.: US 7,947,320 B2
(45) Date of Patent: *May 24, 2011

(54) PRODUCTION OF MULTI-GRAIN, WHOLE-GRAIN, SOFT AND CRUNCHY SHEETED SNACKS

(75) Inventors: Pierre Faa, Frisco, TX (US); Richard Lai, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/370,294

(22) Filed: Feb. 12, 2009

(65) Prior Publication Data

US 2009/0148581 A1    Jun. 11, 2009

Related U.S. Application Data

(62) Division of application No. 11/466,886, filed on Aug. 24, 2006, now Pat. No. 7,507,431.

(51) Int. Cl.
*A23L 1/10* (2006.01)

(52) U.S. Cl. ........ 426/549; 426/551; 426/560; 426/562; 426/808

(58) Field of Classification Search ................. 426/549, 426/551, 560, 562, 808
See application file for complete search history.

(56) References Cited

U.S. PATENT DOCUMENTS

| 4,938,982 A | 7/1990 | Howard |
| 6,479,090 B1 | 11/2002 | Carey et al. |
| 7,507,431 B2 * | 3/2009 | Faa et al. ........................ 426/549 |

* cited by examiner

*Primary Examiner* — Helen F Heggestad
(74) *Attorney, Agent, or Firm* — Colin P. Cahoon; Celina M. Orr; Carstens & Cahoon, LLP

(57) ABSTRACT

The present invention discloses a method for making a multi-grain, whole grain baked snack food product with a soft, crunchy texture similar to a cracker. Ingredient formula ranges have been determined that maximize the amount and number of nutritious whole grains present in the snack food, while still keeping the texture soft and crunchy, and the color and flavor acceptable. The ingredients are combined with water to make a dough, which is then sheeted and cut into pieces. The pieces are baked to produce a multi-grain, whole grain baked snack food.

8 Claims, 1 Drawing Sheet

PRODUCTION OF MULTI-GRAIN, WHOLE-GRAIN, SOFT AND CRUNCHY SHEETED SNACKS

CROSS-REFERENCE TO RELATED APPLICATION

This application is a divisional patent application of U.S. Ser. No. 11/466,886, now U.S. Pat. No. 7,507,431, filed on Aug. 24, 2006, entitled "Production of Multi-Grain, Whole-Grain, Soft and Crunchy Sheeted Snacks." the technical disclosure of which is hereby incorporated herein by reference.

BACKGROUND OF THE INVENTION

1. Technical Field

The present invention relates to a method for making an improved baked snack food and more particularly to a method for making a baked multi-grain, whole-grain snack food that is low in fat and has a soft and crunchy texture similar to a cracker.

2. Description of Related Art

Snack food products such as crackers are popular consumer items for which there exists a great demand. Conventional crackers have a soft, crunchy texture and are typically prepared using refined wheat flour dough (approximately 60% refined wheat flour by weight). The refined wheat flour dough is compressed between a pair of counter rotating sheeter/cutter rollers that are located closely together, thereby providing a pinch point through which the dough is formed into sheets and cut into a desired shape. Often the desired snack piece shape is that of a square or circle. After the dough is cut, the snack pieces are transported towards and through an oven, which reduces the moisture content inside the snack piece. The oven cooks the snack piece and imparts a crunchy texture. The snack pieces are then sent to be packaged.

Although the cooking step imparts a crunchy texture into the cracker, it retains some of its soft texture due to the fat added to the dough in the form of oil and from the soft, refined nature of the wheat flour used. Consequently, the presence of a high content of fat, and of refined wheat flour (which has lost many of the vitamins, minerals, fiber and anti-oxidants present in the original wheat grain) makes conventional crackers a less than ideal healthy snack food option.

In recent years, consumer demand has been dramatically increasing for healthy foods in general, and healthy snack foods in particular. According to the Food and Drug Administration, a diet that is high in fiber can reduce a person's risk of certain cancers, diabetes, digestive disorders, and heart diseases. Fiber can also help people control obesity because insoluble fiber is not digested and passes through the digestive system virtually in tact, providing very few calories. Furthermore, vitamins and minerals are widely recognized as part of a healthy diet. Antioxidants have been proven to reduce the risk of heart disease and cancer, and are suspected of having many other health benefits.

Nutritious snacks should meet several criteria that include limits on the amount of fat, including saturated and trans-fatty acids, cholesterol, sodium, and added sugar. The criteria also include products formulated to have specific health or wellness benefits. Specifically, a nutritious snack should contain, per serving, no more than 35% of its calories from fat, 1 gram or less of saturated fatty acids, zero trans-fatty acids, no more than 60 mg of cholesterol, no more than 270 milligrams of sodium, and more than 10% of the FDA recommended daily value of fiber. No prior art snack food has been able to deliver high levels of multi-grain and whole-grain nutrients, along with these additional hallmarks of nutritious snacks in the form of a soft, crunchy cracker. Consequently, the need exists for a healthy, nutritious snack piece having a soft, crunchy texture.

SUMMARY OF THE INVENTION

The present invention thus provides a great tasting, healthy snack food having a soft, crunchy texture similar to the texture of a cracker. In one aspect of the invention, a high content of whole grain flour is used as a healthier substitute for a portion of the refined wheat flour used in traditional crackers. In another aspect of the invention, at least three different whole grain flours, namely whole wheat flour, brown rice flour, and whole oat flour are used to make the snack food a healthy multi-grain food. In yet another aspect of the invention, waxy starch (starch high in amylopectin), emulsifiers such as lecithin and mono and diglyceride, and potato flakes are substituted for a portion of the refined wheat flour used in traditional crackers in order to impart the desired soft texture into the snack food. The addition of a small amount of double acting baking powder also contributes to a light texture, which is identified by the consumer as a soft texture. Another aspect of the invention involves adding pregelatinized or modified starch, which allows the snack food to expand during cooking and contributes to its crunchy texture. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
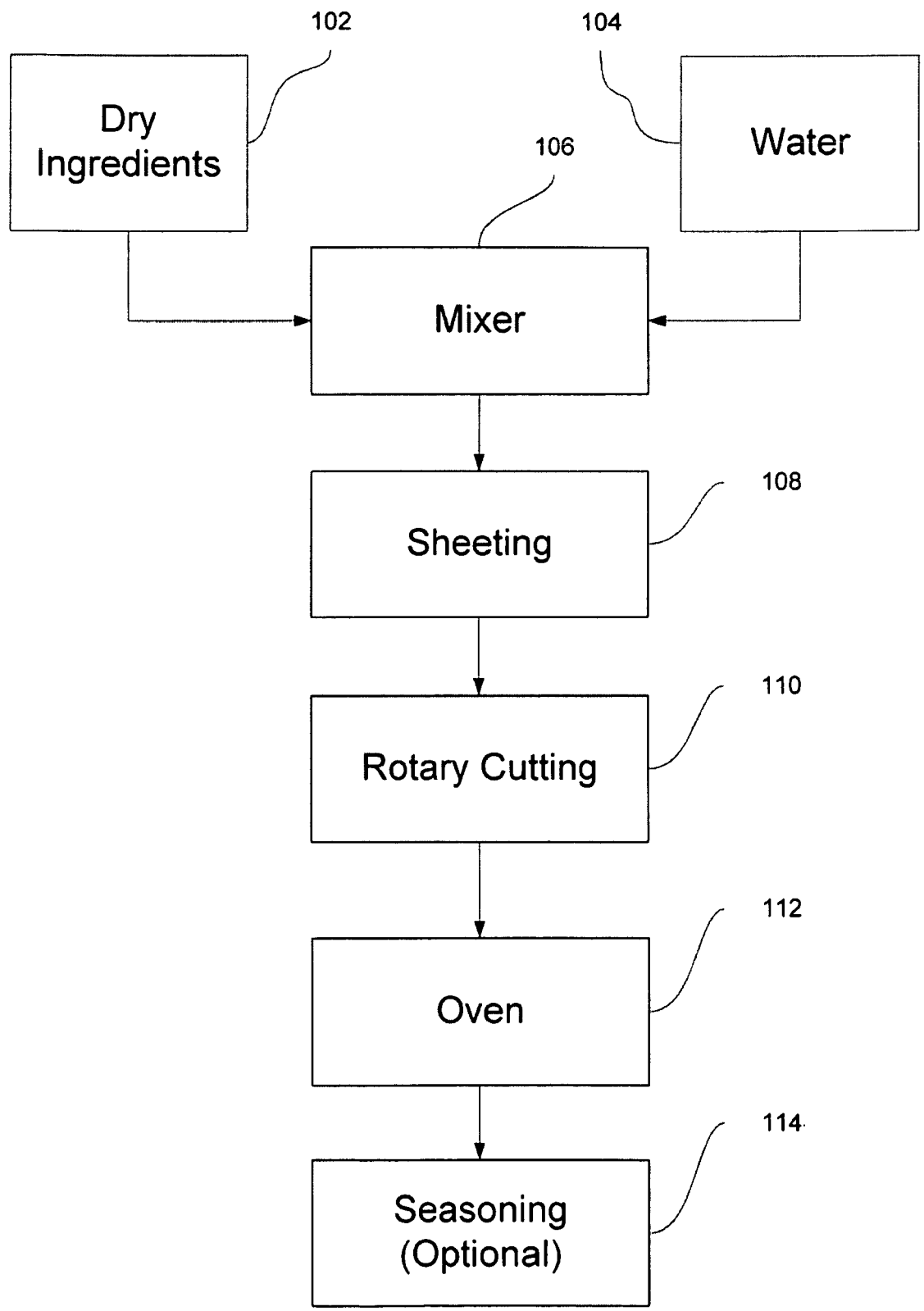
FIG. 1 is a flowchart indicating the processing steps for the present invention.

The whole-grain, multi-grain baked snack food of the present invention is prepared using several different whole grain flours. As used herein, whole grains are cereal grains which retain the bran and germ of the grain kernel as well as the endosperm. By contrast, refined grains retain only the endosperm. The bran is the outer shell of the kernel, and is high in fiber, vitamins and minerals. The germ is located inside the seed, and is high in antioxidants (especially vitamin E) and B vitamins. The remainder of the interior of the kernel is the endosperm, which is mostly composed of carbohydrates and protein.

Thus, whole grains are nutritionally superior to refined grains, and richer in dietary fiber, antioxidants, protein (particularly lysine), dietary minerals (including magnesium, manganese, phosphorus, and selenium), and vitamins (including niacin, vitamin B6, and vitamin E). Moreover, the three different whole grain flours used in the present invention (whole wheat flour, whole oat flour, and brown rice flour) each contain different levels of these nutritious contents relative to one another. It is therefore understood that the use of several different whole grain flours in the present invention makes the snack food described herein nutritionally superior to whole grain products that only utilize one or two whole grain flours. The whole wheat flour used in the present invention is preferably stone ground, with a minimum protein content of 14%, a maximum moisture content of 14%, and a total amount of dietary fiber of about 10.5% by weight. It is produced by ConAgra Foods, Inc. in Omaha, Nebr. under the brand name Medium, Whole Wheat Flour, Stone Ground. Stone grinding creates the specific medium coarse granulation of this flour. The whole oat flour preferably has a maximum moisture content of about 11% and a dietary fiber content of at least about 10% by weight on a dry basis. It is produced by Can-Oat Milling in Portage La Prarie, Manitoba, Canada under the brand name Whole Oat Flour: 105-002. The brown rice flour preferably has a moisture content of about 12% and a total dietary fiber content of at least about 4.5%. It is produced by Sage V Foods, LLC in Los Angeles, Calif. under the brand name Stabilized Brown Rice Flour BF-L04080-12. This flour has been stabilized for extended shelf life.

Using high amounts of whole grain flours in baked snack foods typically imparts a rough, coarse texture into the snack food. Thus, one novel aspect of the present invention relates to the methods employed to create a soft and smooth, yet crunchy texture into the snack food, instead of the rough, gritty texture generally associated with whole grain flours while still using relatively high levels of whole grain flours.

One of the ingredients that helps soften the texture of this whole-grain snack food is starch that has a high content of amylopectin, or waxy starch. Amylopectin is a branch-chained polysaccharide, whereas the other component of most starches, amylose, is a straight-chained polysaccharide. The starch used in the present invention is preferably waxy corn starch. While normal corn starch typically has a ratio of about 25% amylose to about 75% amylopectin, waxy corn starch contains about 100% amylopectin. The waxy starch used in the present invention preferably contains about 100% amylopectin starch and about 0% amylose starch. The waxy texture of the amylopectin starch used in the present invention contributes to the final product characteristic softness. A waxy starch that can be used in the present invention is Staley 7350 Waxy No. 1 Starch from Tate & Lyle, PLC in London, U.K. This waxy starch contains about 100% amylopectin.

Another ingredient in the snack foods described herein that contributes to the final product softness is the addition of potato flakes. Potato flakes are made from potatoes that have been cooked, mashed, and dried. For example, Idaho Pacific Corporation in Ririe, Id. produces potato flakes under the brand name Potato Flakes #124 that can be used as herein described. The potato flakes impart a soft, light and flaky texture to the snack food of the present invention that helps counteract the roughness of the whole grain flours used.

Other ingredients that contribute to the final product softness are the emulsifiers and leavening agent used in the present invention. The first emulsifier is a soy based lecithin powder, for example Solec G-EX available at The Solae Company in St. Louis, Mo. Lecithin is a mixture of various phospholipids, and is extracted from soybean oil. The second emulsifier is a mixture of mono and diglycerides. Glycerides are esters formed from glycerol and fatty acids. A monoglyceride comprises one fatty acid chain covalently bonded to a glycerol molecule through an ester linkage. A diglyceride comprises two fatty acid chains covalently bonded to a glycerol molecule through ester linkages. The ratio of monoglycerides to diglycerides in the emulsifier used in the present invention is about 44% to about 48% monoglycerides, and about 38% to about 42% diglycerides. Such a mixture of mono and diglycerides can be obtained from American Ingredients Company in Kansas City, Mo. under the brand name BFP 64K. Another ingredient that contributes to overall product softness is double acting baking powder, for example Eagle brand double acting baking powder. Double acting baking powder contains two acid salts, one which reacts at room temperature, causing the dough to rise as soon as it is prepared, and another which reacts at a higher temperature, causing a further rise during baking. The double acting baking powder gives the final snack product a light texture that is interpreted by the consumer as a soft texture, and helps counteract the roughness of the whole-grain flour. The double acting baking powder can impart a bad aftertaste used in quantities higher than about 3% of the dough by weight. The low levels of leavening agents used in this invention to produce a cracker-like snack food with a soft, crunchy texture comprise yet another novel aspect of this invention.

As stated previously, the whole grain flour contributes to the crunchiness of the final snack product. Another ingredient that gives the product crunchiness is the addition of pregelatinized and/or chemically modified starch from corn, potato or other origin. Pregelatinized starches have been thermally processed so that they can form pastes or gels when mixed with cold water. These starches, when cooked, impart the desirable crunchy texture to the snack food product of the present invention. Chemically modified starches have been chemically processed to alter their physical properties to provide an expanded and crunchy product. Examples of chemical modifications include, without limitation, cross-linking, substitution, and conversions.

In one preferred embodiment, water is added to the dry ingredients to make a multi-grain, whole grain dough. The resultant dough comprises about 5% to about 25% whole wheat flour, about 5% to about 20% refined wheat flour, about 5% to about 15% modified and/or pregelatinized starch, about 5% to about 15% waxy starch, about 1% to about 8% brown rice flour, about 1% to about 8% whole oat flour, about 1% to about 8% potato flakes, less than about 3% lecithin powder, less than about 1% mono and diglycerides, less than about 2% double acting baking powder, and about 15% to about 30% added water. All percentages used herein are by weight unless otherwise noted.

In a more preferred embodiment, the resultant dough comprises about 10% to about 20% whole wheat flour, about 5% to about 15% refined wheat flour, about 7% to about 13% modified and/or pregelatinized starch, about 7% to about 13% waxy starch, about 2% to about 6% brown rice flour, about 2% to about 6% whole oat flour, about 2% to about 6% potato flakes, less than about 2% lecithin powder, less than about 1% mono and diglycerides, less than about 1% double acting baking powder, and about 15% to about 25% water.

In the most preferred embodiment, the resultant dough comprises about 15% to about 20% whole wheat flour, about 10% to about 15% refined wheat flour, about 9% to about 12% modified and/or pregelatinized starch, about 9% to about 12% waxy starch, about 3% to about 6% brown rice flour, about 3% to about 6% whole oat flour, about 3% to about 6% potato flakes, less than about 2% lecithin powder, less than about 1% mono and diglycerides, less than about 1% double acting baking powder, and about 18% to about 25% water.

Referring to FIG. 1, therein is depicted a flowchart indicating the general processing steps for producing the baked snack food product of the present invention. In the first processing step, the dry ingredients 102 are mixed with water 104 and other ingredients in a continuous, batch or other mixer 106 to produce a dough. The mixing preferably occurs at ambient temperature, generally about 60° F. to about 95° F., and the dough exits the mixer between about 85° F. and about 95° F. More preferably, the water is chilled to about 40° F. to about 60° F. before it is added to the mixer in order to reduce the temperature of the dough exiting the mixer, thus reducing the likelihood of the dough sticking to the rollers during the sheeting step. Using chilled water will reduce the dough temperature by about 5 to about 20 degrees, depending on the extent of the water chilling and the amount of heat generated during mixing.

The dough then undergoes a sheeting step 108, whereby the dough is compressed between a pair of counter rotating sheeter/cutter rollers that are located closely together, thereby providing a pinch point through which the dough is formed into sheets. The sheet of dough is preferably between about 0.050 inches and about 0.055 inches thick, and more preferably about 0.053 inches thick after the sheeting step. The preferred thickness is preferably accomplished by passing the dough through several successive stages, with each successive stage having the rollers located progressively closer together, more preferably 2, 3 or 4 stages of rollers. Passing the dough through several stages of rollers minimizes the amount of work done on the dough during the sheeting step by any particular set of rollers, thereby reducing the influence of the sheeting step on the physical properties of the dough that are established during the mixing step. The pregelatinized starch and/or modified starch in the dough aids in holding the dough together in order to form a continuous sheet.

The sheet of dough is then cut into a plurality of pieces 110, preferably using a rotary cutting unit. The pieces are then baked in an oven 112 at between about 240° F. and about 500° F. to form a snack food having a moisture content between about 1% and about 3% of the total product weight. The snack food can then be seasoned 114 in a seasoning tumbler and then packaged.

The resultant snack piece in one preferred embodiment comprises about 10% to about 25% whole wheat flour, about 5% to about 20% enriched wheat flour, about 5% to about 20% modified starch, about 5% to about 20% waxy starch, about 1% to about 9% potato flakes, about 1% to about 9% whole oat flour, about 1% to about 9% whole rice flour, about 1% to about 3% water, less than about 3% lecithin, less than about 1% glycerides, and less than about 2% leavening. The resultant snack piece in another preferred embodiment comprises about 15% to about 25% whole wheat flour, about 10% to about 20% enriched wheat flour, about 10% to about 20% modified starch, about 10% to about 20% waxy starch, about 2% to about 8% potato flakes, about 2% to about 8% whole oat four, about 2% to about 8% whole rice flour, about 1.5% to about 3% water, less than about 2% lecithin, less than about 1% glycerides, and less than about 1% leavening.

First Example

The table below illustrates the ingredients and their relative amounts that were used to make a multi-grain, whole grain snack food product with a soft, crunchy texture similar to that of a cracker:

TABLE I

| Ingredient | Wt. % Dry Ingredients | Wt. % Dough | Wt. % Seasoned Product |
|---|---|---|---|
| Whole Wheat Flour | 19.63% | 15.65% | 18.04% |
| Refined Wheat Flour | 14.22% | 11.34% | 12.53% |
| Modified Starch | 12.80% | 10.21% | 12.32% |
| Waxy Starch | 12.80% | 10.21% | 11.41% |
| Corn Oil | 10.67% | 8.51% | 12.88% |
| Sugar (granulated) | 7.97% | 6.35% | 8.15% |
| Honey | 4.27% | 3.4% | 3.56% |
| Brown Rice Flour | 4.27% | 3.4% | 3.85% |
| Whole Oat Flour | 4.27% | 3.4% | 3.93% |
| Potato Flakes | 4.27% | 3.4% | 4.05% |
| Lecithin Powder | 1.71% | 1.36% | 1.72% |
| Wheat Germ | 1.42% | 1.13% | 1.35% |
| Mono & Diglycerides | 0.85% | 0.68% | 0.87% |
| Double Acting Baking Powder | 0.43% | 0.34% | 0.42% |
| Salt | 0.28% | 0.23% | 0.90% |
| Annatto | 0.14% | 0.11% | 0.12% |
| Seasoning | — | — | 1.99% |
| Added Water | — | 20.26% | 1.91% |

In this embodiment, dry ingredients were combined in a dry ribbon batch mixer for approximately 4 minutes. The dry ingredient mix then passed through a twin-screw extrusion continuous dough mixer for about 42 seconds that added the honey, water and oil to create the dough. The dough exited the mixer at between 85° F. and 92° F. The dough was then sheeted using 2 stages of rollers to produce a sheet of dough about 0.053 inches thick. The sheet of dough then passed through a rotary cutting step that produced a plurality of square shaped pieces. The pieces were then baked in a Wolverine jet impingement oven for 65 seconds at 425° F. to produce partially baked snack pieces having a total moisture content between 3.5% and 6.5% by weight. The partially baked pieces were then dried in a Wenger convection oven for 7 minutes at 240° F. to a final moisture content between 2% and 2.5%. The final snack pieces were then seasoned using a tumbler, where they were lightly sprayed with oil and salt.

Second Example

The table below illustrates the ingredients and their relative amounts that were used to make a multi-grain, whole grain snack food product with a soft, crunchy texture similar to that of a cracker:

TABLE II

| Ingredient | Wt. % Dry Ingredients | Wt. % Dough | Wt. % Seasoned Product |
|---|---|---|---|
| Whole Wheat Flour | 21.25% | 16.39% | 19.82% |
| Refined Wheat Flour | 14.16% | 10.93% | 12.66% |
| Modified Starch | 12.75% | 9.84% | 12.45% |
| Waxy Starch | 12.75% | 9.84% | 11.53% |
| Corn Oil | 10.62% | 8.20% | 13.00% |
| Corn Syrup | 4.53% | 3.50% | 3.86% |
| Sugar (granulated) | 3.40% | 2.62% | 3.53% |
| Honey | 4.25% | 3.28% | 3.60% |
| Brown Rice Flour | 4.25% | 3.28% | 3.89% |
| Whole Oat Flour | 4.25% | 3.28% | 3.97% |
| Potato Flakes | 4.25% | 3.28% | 4.09% |
| Lecithin Powder | 0.00% | 0.00% | 0.00% |
| Wheat Germ | 1.42% | 1.09% | 1.37% |
| Mono & Diglycerides | 0.85% | 0.66% | 0.88% |
| Double Acting Baking Powder | 0.42% | 0.33% | 0.42% |
| Ammonium Bicarbonate | 0.42% | 0.33% | 0.42% |
| Salt | 0.28% | 0.22% | 0.90% |
| Annatto | 0.14% | 0.11% | 0.13% |
| Seasoning | — | — | 1.99% |
| Added Water | — | 22.84% | 1.91% |

In the above embodiment, all of the ingredients were mixed in a batch mixer for about 8 minutes. The resulting dough exited the mixer at between 88° F. and 95° F., and was allowed to rest for about 20 minutes. The dough was then sheeted using 4 stages of rollers, which produced a sheet of dough approximately 0.053 inches thick. The sheet of dough was cut into individual pieces of dough square in shape. The dough pieces were then baked in an APV direct fired gas oven at 400° F. for 5.5 minutes to produce baked snack pieces having a moisture content of between about 2% and about 2.5%. The baked snack pieces were then seasoned using a tumbler, where they were lightly sprayed with oil and salt.

The baked snack pieces produced by both of the above examples had the desired soft, crunchy texture similar to the texture of a cracker. The hardness and crunchiness of the snack pieces were measured using a 6 millimeter diameter Magness Taylor probe mounted on a texture analyzer such as a TA.XT2 Texture Analyzer manufactured by Stable Micro Systems, Ltd. in Godalming, Surrey, U.K. and distributed in North America by Texture Technologies Corp. in Scarsdale, N.Y. In order to determine the texture of the snack piece, it undergoes a Texture Testing Protocol. For purposes of this application, the Texture Testing Protocol for the present invention is as follows: (1) mount the snack piece on a solid base support with a diameter of about 20 millimeters and a hole centered under the probe; (2) puncture a hole in the snack piece using a Magness Taylor probe having a 6 millimeter diameter traveling at a speed between about 1 millimeter per second and about 20 millimeters per second through a distance of about 3 millimeters; (3) measure and plot the force required for the probe to break through the snack piece in grain force versus time. The maximum force (in grams) of the resulting puncture curve is the characteristic hardness of the snack piece. The slope of the puncture curve reflects how fast the cracker crumbles and disintegrates, which is the characteristic crunchiness of the snack piece. The crunchiness is expressed in force per time or, with respect to the present invention, grams per second. The snack piece of the present invention has a hardness measured pursuant to the Texture Testing Protocol of between about 8000 grams of force to about 13000 grams of force. The snack piece of the present invention has a crunchiness measured pursuant to the Texture Testing Protocol that ranges from about 8000 grams per second to about 12000 grams per second. Hereinafter, when Applicants refer to the Texture Testing Protocol in either the specification or the claims, Applicants intend that the term Texture Testing Protocol means using the specific testing methods and equipment described above.

In addition, the snack pieces contained high levels of multi-grains and whole grains, and met the other industry established guidelines for nutrition. Specifically, the baked snack pieces had less than 35% of their calories from fat, 1 gram or less of saturated fat per serving, zero trans fat, no more than 60 mg of cholesterol and no more than 270 milligrams of sodium per serving, and more than 10% of the FDA recommended daily value of fiber per serving. In sum, the result is a healthy, nutritious, multi-grain, whole grain snack having a soft, crunchy texture similar to a cracker.

What is claimed is:

1. A method for making a whole-grain, multi-grain snack food, said method comprising the steps of:
    a. mixing dry ingredients, oil and water to make a dough, wherein said dough comprises by weight:
    about 10% to about 25% whole wheat flour;
    about 5% to about 15% refined wheat flour;
    about 5% to about 15% modified starch;
    about 5% to about 15% waxy starch;
    about 3% to about 8% brown rice flour;
    about 3% to about 8% whole oat flour;
    about 1% to about 8% potato flakes;
    less than about 3% lecithin;
    less than about 1% mono and diglyceride mixture;
    less than about 2% double acting baking powder;
    about 15% to about 30% added water;
    b. forming said dough into a sheet;
    c. cutting said sheet into a plurality of pieces; and
    d. cooking said pieces to make a snack food comprising a moisture content of between about 1% to about 3% by weight, a characteristic hardness between about 8000 grams of force to about 13000 grams of force when measured using a Texture Testing Protocol, and a characteristic crunchiness between about 8000 grams per second to about 12000 grams per second when measured using said Texture Testing Protocol.

2. The method of claim 1 further comprising:
    e) seasoning said snack food.

3. A snack food made from the method of claim 1.

4. A method for making a whole-grain, multi-grain snack food, said method comprising the steps of:
    a. mixing dry ingredients, oil and water to make a dough, wherein said dough comprises by weight:
    about 15% to about 25% whole wheat flour;
    about 5% to about 15% refined wheat flour;
    about 5% to about 15% modified starch;
    about 5% to about 15% waxy starch;
    about 1% to about 8% brown rice flour;
    about 1% to about 8% whole oat flour;
    about 1% to about 8% potato flakes;
    less than about 3% lecithin;
    less than about 1% mono and diglyceride mixture;
    less than about 2% double acting baking powder; and
    about 15% to about 30% added water;
    b. forming said dough into a sheet;
    c. cutting said sheet into a plurality of pieces; and
    d. cooking said pieces to make a snack food comprising a moisture content of between about 1% to about 3% by weight, a characteristic hardness between about 8000 grams of force to about 13000 grams of force when measured using a Texture Testing Protocol, and a characteristic crunchiness between about 8000 grams per second to about 12000 grams per second when measured using said Texture Testing Protocol.

5. The method of claim 4 further comprising:
    e) seasoning said snack food.

6. A snack food made from the method of claim 4.

7. A whole-grain, multi-grain snack food comprising by weight:
    about 15% to about 25% whole wheat flour;
    about 5% to about 13% refined wheat flour;
    about 5% to about 20% modified starch;
    about 5% to about 20% waxy starch;
    about 1% to about 9% whole rice flour;
    about 1% to about 9% whole oat flour;
    about 1% to about 9% potato flakes;
    less than about 3% lecithin;
    less than about 1% mono and diglyceride mixture;
    less than about 2% leavening;
    about 1% to about 3% water;
    a characteristic hardness between about 8000 grams of force to about 13000 grams of force when measured using a Texture Testing Protocol; and
    a characteristic crunchiness between about 8000 grams per second to about 12000 grams per second when measured using said Texture Testing Protocol.

8. A whole-grain, multi-grain snack food comprising by weight:
   about 10% to about 25% whole wheat flour;
   about 5% to about 13% enriched wheat flour;
   about 5% to about 20% modified starch;
   about 5% to about 20% waxy starch;
   about 1% to about 9% potato flakes;
   about 2% to about 8% whole oat flour;
   about 2% to about 8% whole rice flour;
   about 1% to about 3% water;
   less than about 3% lecithin;
   less than about 1% mono and diglyceride mixture; and
   less than about 2% leavening;
   a characteristic hardness between about 8000 grams of force to about 13000 grams of force when measured using a Texture Testing Protocol; and
   a characteristic crunchiness between about 8000 grams per second to about 12000 grams per second when measured using said Texture Testing Protocol.

\* \* \* \* \*